(12) United States Patent
Czinki et al.

(10) Patent No.: US 8,197,006 B2
(45) Date of Patent: Jun. 12, 2012

(54) FOLDABLE VEHICLE SEAT

(75) Inventors: Alexander Czinki, Aschaffenburg (DE); Hans Schmodde, Böblingen (DE); Clemens Lowinski, Hilden (DE); Piotr Szableswki, Wuppertal (DE); Richard Boudinot, Düsseldorf (DE); Sven Natus, Trier (DE); Robert Schüle, Böblingen (DE)

(73) Assignee: Johnson Controls GmbH, Burscheid (DE)

( * ) Notice: Subject to any disclaimer, the term of this patent is extended or adjusted under 35 U.S.C. 154(b) by 414 days.

(21) Appl. No.: 11/597,145

(22) PCT Filed: May 12, 2005

(86) PCT No.: PCT/EP2005/052185
§ 371 (c)(1),
(2), (4) Date: May 5, 2008

(87) PCT Pub. No.: WO2005/113283
PCT Pub. Date: Dec. 1, 2005

(65) Prior Publication Data
US 2008/0272637 A1    Nov. 6, 2008

(30) Foreign Application Priority Data

May 21, 2004  (DE) .................. 10 2004 025 507

(51) Int. Cl.
*B60N 2/02* (2006.01)
(52) U.S. Cl. .................. 297/362.11; 297/362; 297/367

(58) Field of Classification Search .......... 297/285–309, 297/361.1–382, 112–114; 296/65.17
See application file for complete search history.

(56) References Cited

U.S. PATENT DOCUMENTS

| | | | | |
|---|---|---|---|---|
| 2,616,483 A * | 11/1952 | Jensen | ................ | 297/300.6 |
| 4,408,799 A * | 10/1983 | Bowman | ................ | 297/354.12 |
| 4,629,252 A * | 12/1986 | Myers et al. | ................ | 297/366 |
| 5,315,726 A * | 5/1994 | Borenstein | ................ | 5/618 |
| 5,348,373 A * | 9/1994 | Stiennon | ................ | 297/344.1 |
| 5,707,112 A * | 1/1998 | Zinn | ................ | 297/378.14 |
| 5,733,007 A * | 3/1998 | Williams | ................ | 297/367 R |
| 5,842,743 A * | 12/1998 | Wright et al. | ................ | 297/378.1 |
| 5,884,970 A * | 3/1999 | Howard | ................ | 297/362.14 |
| 6,270,141 B2 * | 8/2001 | Moon et al. | ................ | 296/65.17 |
| 6,623,077 B1 * | 9/2003 | Piaulet et al. | ................ | 297/330 |
| 6,629,732 B1 * | 10/2003 | Ursel et al. | ................ | 297/362.11 |
| 7,360,838 B2 * | 4/2008 | Smuk | ................ | 297/367 R |
| 2009/0127905 A1 * | 5/2009 | Schmitz et al. | ................ | 297/284.4 |

FOREIGN PATENT DOCUMENTS

| | | |
|---|---|---|
| DE | 195 02 333 A1 | 8/1996 |
| DE | 198 36 060 A1 | 12/1999 |
| DE | 199 52 963 A 1 | 5/2001 |
| DE | 102 09 759 A1 | 9/2003 |

(Continued)

OTHER PUBLICATIONS

International Search Report for PCT/EP2005/052185, date of mailing Nov. 7, 2006, 3 pages.

*Primary Examiner* — Laurie Cranmer
(74) *Attorney, Agent, or Firm* — Foley & Lardner LLP

(57) ABSTRACT

A vehicle seat includes a pivotable backrest, a locking/unlocking mechanism and an adjustment mechanism. The backrest is counterbalanced such that torque produced by the weight of the backrest during pivoting is adjustable by a counter torque.

9 Claims, 3 Drawing Sheets

FOREIGN PATENT DOCUMENTS

| | | |
|---|---|---|
| DE | 103 11 735 A1 | 10/2004 |
| DE | 103 56 614 A1 | 7/2005 |
| WO | WO 01/32462 A1 | 5/2001 |
| WO | WO 02/16161 A1 | 2/2002 |
| WO | WO 02/053409 A1 | 7/2002 |
| WO | WO 03/039905 A1 | 5/2003 |

* cited by examiner

FOLDABLE VEHICLE SEAT

CROSS-REFERENCE TO RELATED PATENT APPLICATIONS

This Application is a National Phase filing and claims priority to, and incorporates herein by reference, PCT Patent Application PCT/EP2005/052185, filed May 12, 2005 which published under PCT Article 21(2) on Dec. 1, 2005 as WO 2005/113283 A2 in the German language which claims priority to German Priority Application 102004025507.5, filed May 21, 2004 including the specification, drawings, claims and abstract, which is incorporated herein by reference in its entirety.

BACKGROUND

The present invention relates to a vehicle seat whose backrest may be pivoted about a rotational axis from a use position to a storage position.

Vehicle seats are present in a plurality of vehicles and accordingly known from the prior art. Frequently, these vehicles have a drive which carries out the adjustment of the vehicle seat from the use position to the storage position and back. According to the prior art, generally these drives have to have a relatively high torque, as they have to overcome the torques produced by the dead weight during the pivoting of the backrest.

Furthermore, these drives have to have a self-locking mechanism in order to hold the backrest in the respective position. There is a potential risk from this mechanism, in particular because of the relatively high torque. For example, people or objects may become trapped. Furthermore, it is possible that, due to the failure of the drive, for example, the seat backrest is maintained in an undesirable intermediate position and/or the backrest is no longer able to be moved out of one of the final positions, due to a failure of the drive.

It is, therefore, an object to provide a vehicle seat which does not have the drawbacks of the prior art.

SUMMARY AND DESCRIPTION

It was extremely surprising and unexpected for the inventors and would be for a person skilled in the art that it is possible to adjust the backrest of the seat from its used position into its storage position using very low torques and/or a very small amount of drive energy. As a result, the risk of crushing the occupants of the vehicle or objects transported in the vehicle, is minimized. An adjustment of the seat backrest, which is driven by motor or driven pneumatically, may be manually suppressed and/or increased or rotated at any time. When the drive and/or the control system thereof and/or the energy source thereof fail, it is possible at any time to adjust the seat manually. Furthermore, with the seat disclosed, it is impossible for said seat to be locked in an undesirable intermediate position. The seat disclosed is simple and inexpensive to manufacture.

A vehicle seat includes a means which counterbalances the backrest. Counterbalancing signifies the means to at least substantially adjust the torque produced by the weight of the backrest during pivoting by a corresponding counter torque. The counter torque may, for example, be adjusted by a spring or a weight with a corresponding lever. The mechanism is preferably designed such that, in every phase of the positioning sequence of the seat between the final positions, only minimum controlling torques are necessary for the movement. Accordingly, the inherent tendency of the backrest to alter the respective intermediate position during the movement sequence is only manifested as very low, and is preferably not present. A drive is designed to overcome the torque in the folded position and the driving power for pivoting the seat backrest may be so low, such that the driven movement sequence may be manually stopped or even reversed, so that appropriate sensors, which might respond in the presence of an obstruction, or other active safety mechanisms, may be dispensed with.

In one exemplary embodiment, the pivoting movement is carried out by an electric and/or pneumatic drive. The drive preferably has no self-locking mechanism and is preferably dimensioned such that it may be manually suppressed and/or overridden.

In one exemplary embodiment, the seat has a locking/unlocking mechanism, which locks the backrest in the respective position, preferably the storage position or the use position. In embodiment, the locking/unlocking mechanism has a pneumatic and/or electric drive. In one exemplary embodiment, the locking/unlocking mechanism may also be manually actuated. This embodiment has the advantage that when the drive, the control system thereof or the energy supply thereof fails, the vehicle seat does not have to be left in the storage position or the use position, or in any position which represents a safety risk.

The drive of the backrest and/or the locking/unlocking mechanism may have a preferably electronic control system for actuating the drives. Preferably, the control system is designed such that undesirable, possibly locked positions of the backrest may be avoided, such as a backrest which has not been moved fully downwards and points at the head of the driver which might imply a safety risk for the driver during a collision.

In one exemplary embodiment, the locking/unlocking mechanism is designed to be self-resetting when the drive or the control system fails, so that when the respective drive fails, an automatic relocking of the backrest is possible.

The drive and the locking mechanism are preferably of modular construction, resulting in advantageous assembly and manufacturing processes.

DETAILED DESCRIPTION

Figure 1:
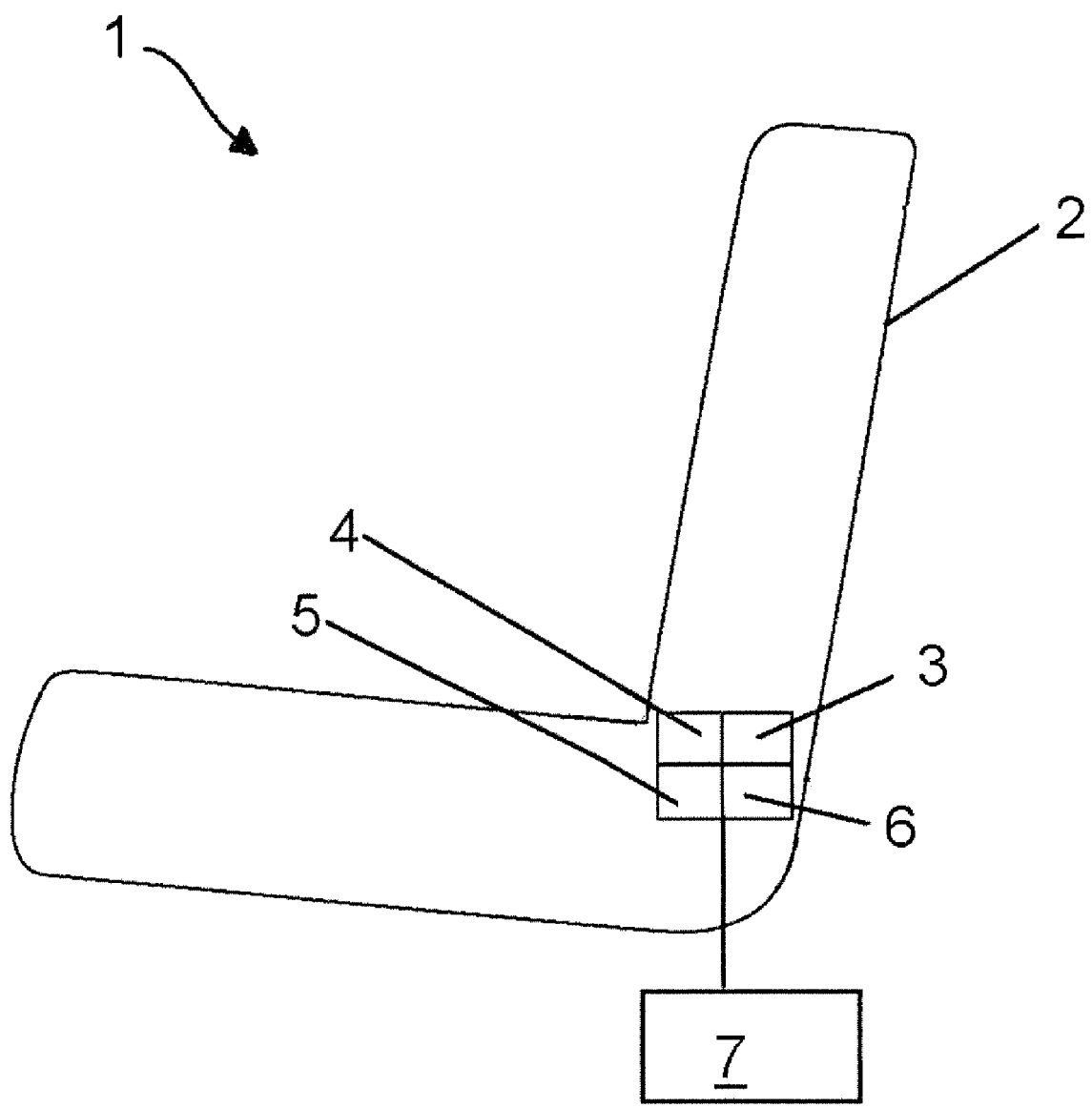
FIG. 1 is a schematic drawing showing a vehicle seat in a use position according to one embodiment of the present invention.
Figure 2:
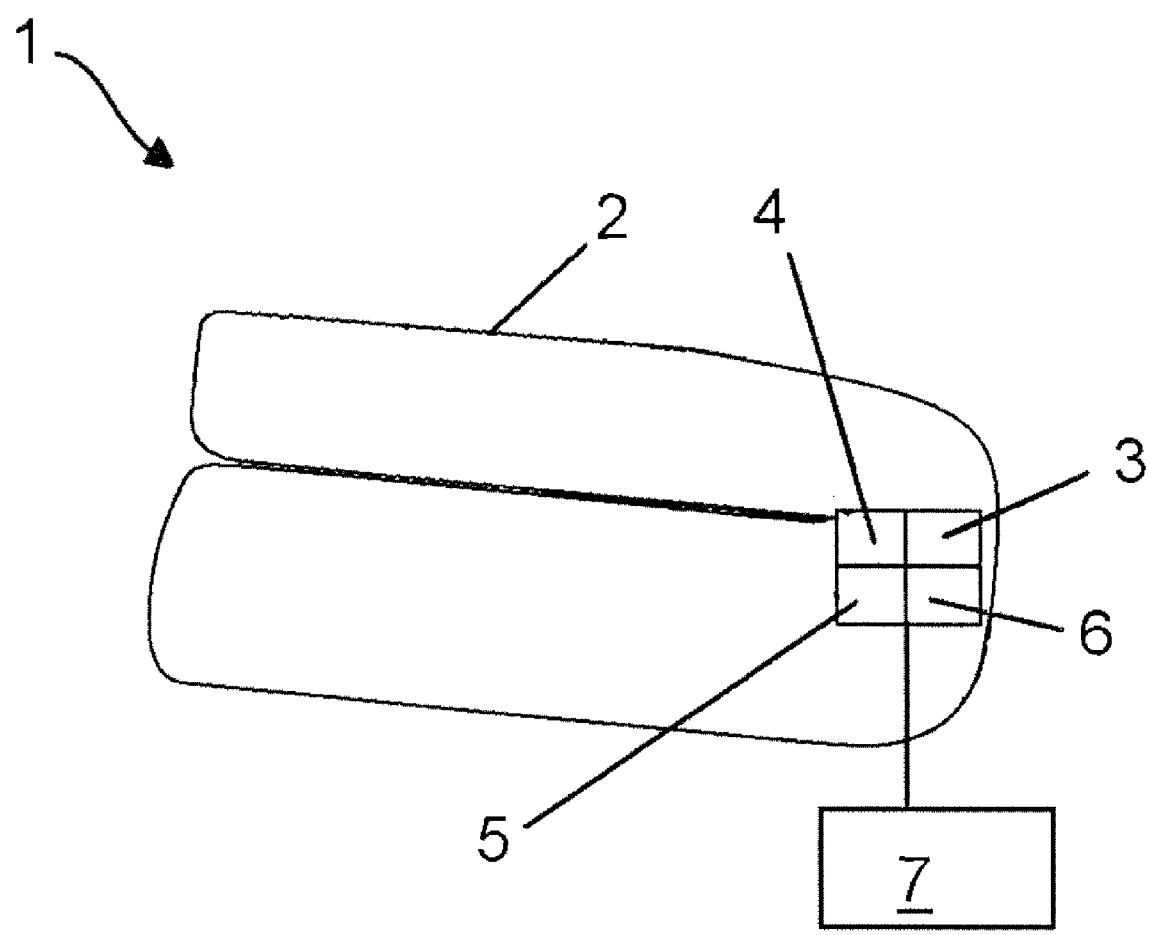
FIG. 2 is a schematic drawing showing the vehicle seat of FIG. 1 in a folded position.

FIG. 1 shows a vehicle seat in a use position and FIG. 2 shows the vehicle seat of FIG. 1 in a folded position. The vehicle seat 1 comprises a backrest 2 pivotable about a rotational axis from a use position to a folded position, an electric drive 3, and a locking/unlocking mechanism 4 with a drive 5. The backrest is counterbalanced such that the torque produced by the weight of the backrest during pivoting is adjustable by a counter torque. The backrest 2 is counterbalanced using a counterbalancing mechanism 6, such as a spring or a weight with a corresponding lever. The electric drive 3 is configured to pivot the backrest 2, has no self-locking mechanism, and may also be manually suppressed and/or overridden. The locking/unlocking mechanism 4 is configured to lock the backrest in one of the use position and the folded position, comprises a drive 5, and may be manually actuated or activated by the electric drive 5. The drive 3 and the locking/unlocking mechanism 4 are respectively separate units which may be combined with one another in a modular manner.

Figure 3:
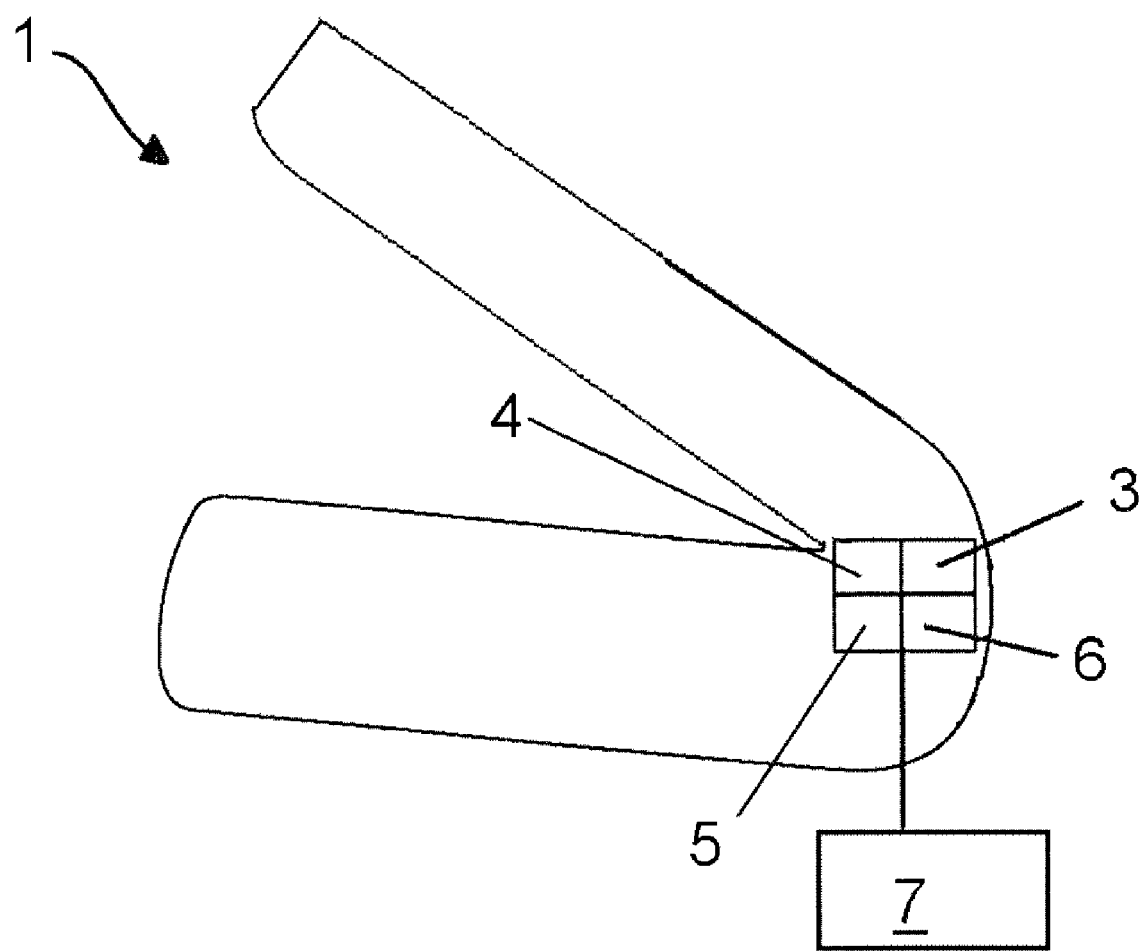
FIG. 3 is a schematic drawing showing the vehicle seat of FIG. 1 in a position that points at the head of the driver.

The drive 3 and the drive 5 may have a preferably electronic control system 7 for actuating the drives 3 and 5. Preferably, the control system 7 is designed such that undesirable, possibly locked positions of the backrest (such as the one shown in FIG. 3) may be avoided, such as a backrest which has not been moved fully downwards and points at the head of the driver which might imply a safety risk for the driver during a collision.

The invention claimed is:

1. A vehicle seat comprising:
    a backrest pivotable about a rotational axis from a use position to a folded position, wherein the backrest is counterbalanced such that torque produced by the weight of the backrest during pivoting is adjustable by a counter torque acting directly on the backrest; and
    an electric drive configured to pivot the backrest, wherein the electric drive may be at least one of manually suppressed and manually overridden; and
    a locking/unlocking mechanism configured to lock the backrest in one of the use position and the folded position, wherein the electric drive is a first electric drive, and wherein the locking/unlocking mechanism comprises a second electric drive.

2. The vehicle seat of claim 1, wherein the locking/unlocking mechanism is configured to be manually actuated or activated by the second electric drive.

3. The vehicle seat of claim 1, further comprising a control system for the first electric drive of the backrest.

4. The vehicle seat of claim 3, wherein the control system is configured to avoid the backrest from being in a third position other than the use and folded positions.

5. The vehicle seat of claim 3, wherein the locking/unlocking mechanism is configured to reset when the first electric drive or the control system fails such that automatic relocking occurs.

6. The vehicle seat of claim 5, wherein the first electric drive and the locking/unlocking mechanism are respectively separate units which may be combined with one another in a modular manner.

7. The vehicle seat of claim 1, wherein the backrest is counterbalanced using one of a spring and a weight with a corresponding lever.

8. The vehicle seat of claim 1, wherein the backrest is counterbalanced by a mechanism interacting with the backrest such that the counter torque acting on the backrest is produced.

9. A vehicle seat comprising:
    a backrest pivotable about a rotational axis from a use position to a folded position, wherein the backrest is counterbalanced such that torque produced by the weight of the backrest during pivoting is adjustable by a counter torque actin directly on the backrest; and
    an electric drive configured to pivot the backrest, wherein the electric drive may be at least one of manually suppressed and manually overridden,
    wherein the counter torque is caused by a force such that the force causing the counter torque directly acts on the backrest.

\* \* \* \* \*